United States Patent [19]

Condevaux

[11] 3,945,742
[45] Mar. 23, 1976

[54] DEVICE FOR ASSEMBLING SECTIONAL FOR INSTANCE METALLIC BARS

[76] Inventor: Georges Julien Condevaux, 159, rue Blomet, Paris, France, 75015

[22] Filed: Dec. 18, 1974

[21] Appl. No.: 534,154

[30] Foreign Application Priority Data
Dec. 19, 1973 France .............................. 73.45532

[52] U.S. Cl. ................................ 403/255; 403/192
[51] Int. Cl.² ............................................ F16B 7/04
[58] Field of Search .......... 403/252, 255, 264, 192, 403/323, 322, 231, 230; 52/238, 656, 754, 756

[56] References Cited
UNITED STATES PATENTS

| | | | |
|---|---|---|---|
| 3,451,183 | 6/1969 | Lespagnol et al. | 403/230 X |
| 3,749,432 | 7/1973 | Janssen | 52/238 X |
| 3,795,453 | 3/1974 | Condevaux | 52/754 X |

Primary Examiner—Andrew V. Kundrat

[57] ABSTRACT

Device for assembling a first sectional bar onto a second sectional bar, comprising a tubular element positioned within the end of a hollow core of the first bar and having an elongated head portion adapted to be inserted into a groove of the second bar and locked within the said groove by means of a set screw threaded into a hole of said tubular element, said screw extending through an elongated opening of one face of the core of the first bar, whereby said element and said head portion may be fully retracted inside of said core of said first bar.

6 Claims, 11 Drawing Figures

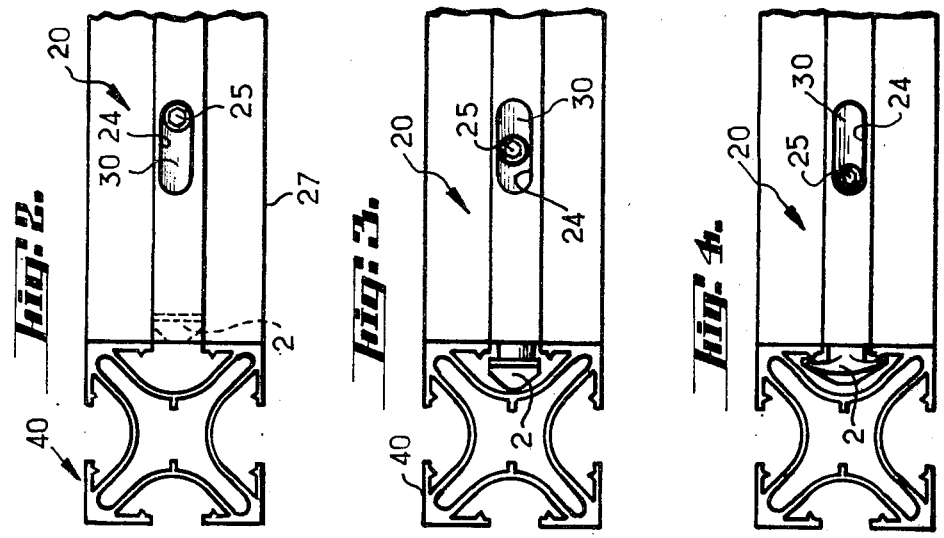
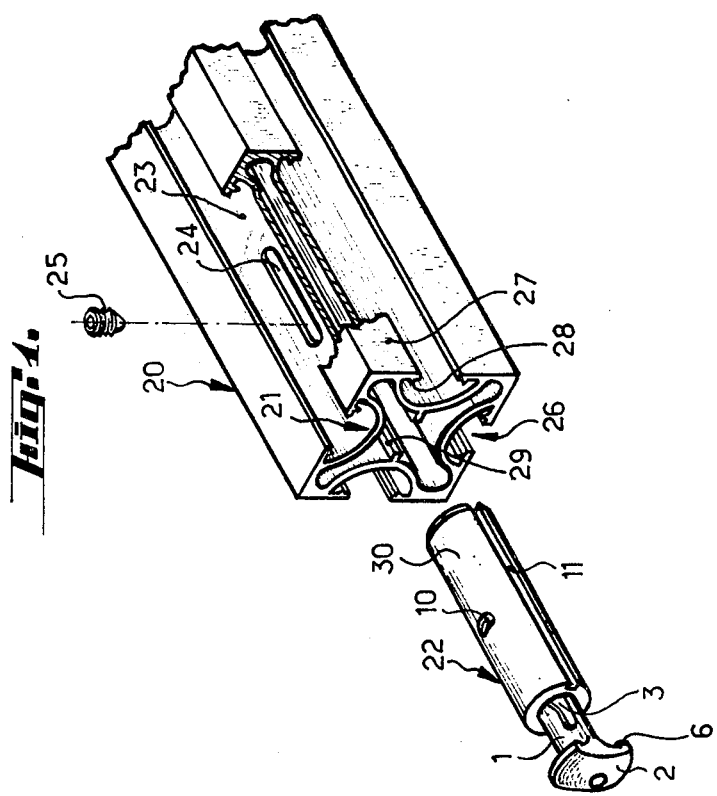

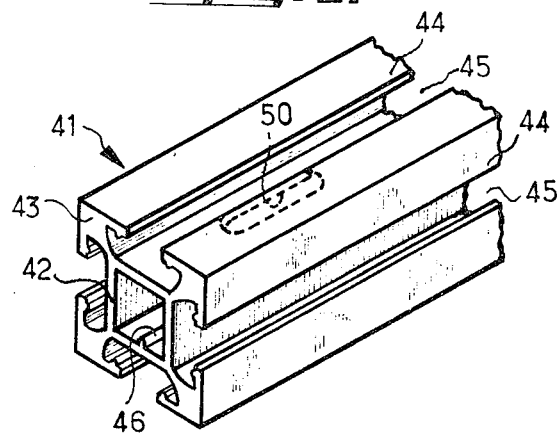
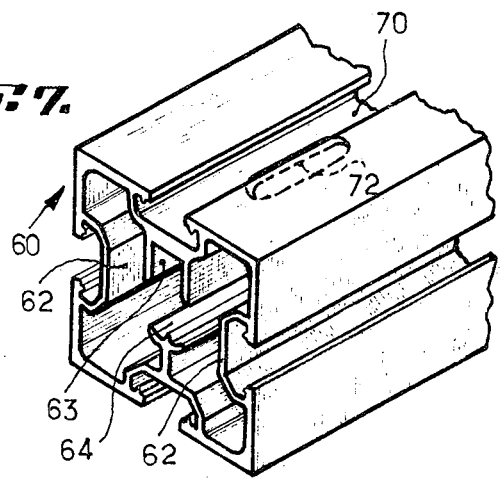
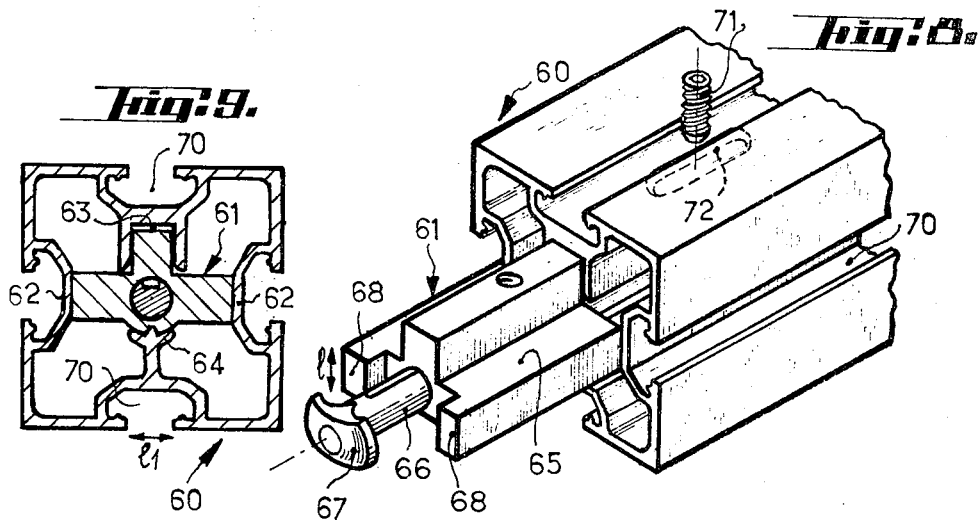

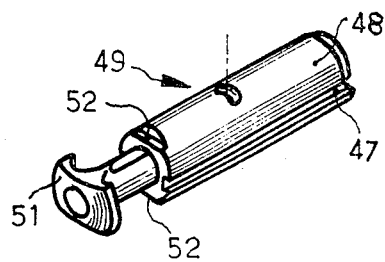
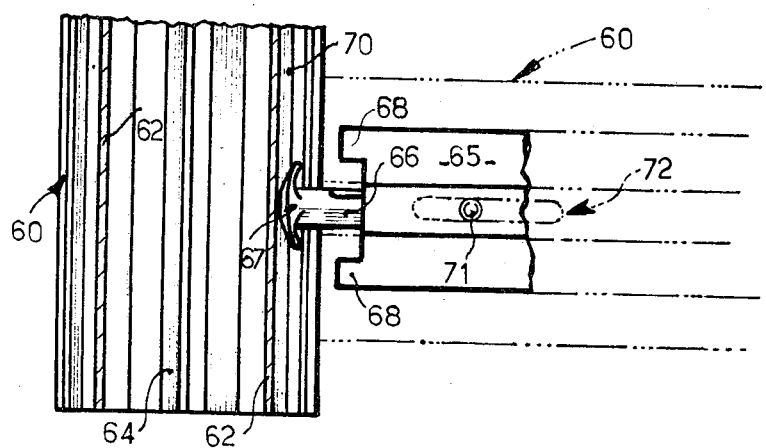
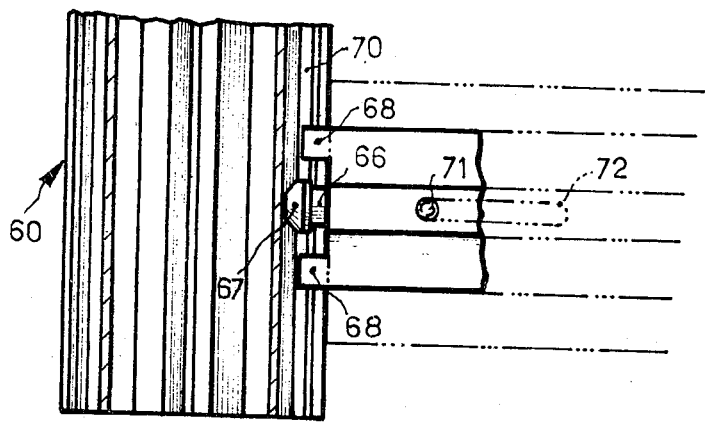

DEVICE FOR ASSEMBLING SECTIONAL FOR INSTANCE METALLIC BARS

The invention relates essentially to improvements in devices or members for assembling sectional bars or like structural beams or shaped elements, for instance metallic sectional bars adapted to be used as frameworks or like reinforcing bracings or trusses for lightweight partition walls of buildings, for instance for office rooms as well as to the various applications resulting from the use thereof and to the systems, arrangements, appliances, contrivances, equipments or installations fitted with such devices.

Such devices are already known in the prior state of the art for endwise assembling a first sectional element or structural bar to a second structural member or like shaped or sectional bar arranged at right angles thereto and which comprises at least one flat face provided with a half-closed groove or slot. The assembling element or a like tie member, connecting part or fastening unit comprises a rod which is received in a cylindrical hole of an element forming a body portion and which is formed with an elongated head portion with parallel sides adapted to be inserted into the groove or slot of the sectional bar at any point thereof and then locked or held against motion in this groove by being rotated through a quarter turn, the assembling member comprising a set screw accommodated in a screw-threaded hole opening into the aforesaid cylindrical hole and enabling to hold the rod against motion within the element or body in the tightening or clamping position.

For this purpose the set screw is caused to engage a high or coarse pitch helical groove which extends over about a quarter turn around the rod, stem or shank of the jointing or coupling element forming the connecting or assembling member and which enables to bring its head portion into locking position within the groove of the sectional bar through simple axial pressure reflected by a rotation through a quarter turn of the head portion. The aforesaid groove leads to or terminates in a cup-like or trough-shaped recess the position and configuration of which provide for the tightening or clamping of the lips or edges of the groove between the head of the aforesaid member and the end of the sectional bar extending at right angles thereto. The first sectional bar however which is adapted to be mounted perpendicularly onto the second sectional bar by means of the assembling member comprises at one of its ends this member the head of which is necessarily jutting out in projecting relation-ship and is in extension of the first sectional bar. This arrangement therefore prevents the first sectional bar to be drawn near the second one at right angles thereto, i.e. a horizontal sectional bar for instance may not be directly positioned at right angles between two vertical standards, uprights or sectional bars in one single operating step.

Moreover the assembly or fastening connection achieved is not strictly indeformable as nothing prevents any relative rotation of a first sectional bar with respect to a second one when they are mounted onto each other in perpendicular relationship.

For these grounds the assembling or coupling members of the kind described have been considered to be not very satisfactory and one object of the invention is just to provide improvements to these assembling members enabling to overcome all of the aforesaid inconveniences.

For this purpose the invention provides a bonding or coupling member for assembling a first sectional bar endwise into a second sectional bar extending at right angles thereto and including at least one flat face provided with a half-closed groove or slot, said member comprising a stem-like rod or shank received in a tubular element or the like and provided with an elongated head portion with parallel sides, adapted to be inserted into the groove of the second sectional bar at any point thereof and then locked in the latter by being rotated through a quarter turn, a set screw screwed into a screw-threaded hole of said element and engaging a high or coarse pitch helical groove extending over a quarter turn about the stem or shank of the assembling member and terminating in a cup-like recess into which said screw is projecting for holding said shank against motion in the clamping position, the position and shape of the cup-like recess providing for the lips or edges of the groove being tightly pressed against the head portion of said member and the end of said first sectional bar, said member being characterized in that said element is located within the end of a hollow core of said first sectional bar, one face of this core being formed with an elongated opening through which extends the aforesaid set screw so that by shifting said screw within said opening the head of the assembling member may be fully retracted inside of the hollow core of said sectional bar, said element also comprising means preventing its relative rotation with respect to at least one of said sectional bars.

Thus according to the invention owing to the fact that the assembling member may be fully hidden or concealed inside of the first sectional bar all the mounting difficulties of the prior art are thereby avoided. Moreover the element of the assembling member into which said stem is projecting is provided with means which prevent the relative rotation of this element with respect to at least one of the two sectional bars so that the relative rotation of a sectional bar with respect to the other one may thus be avoided thereby resulting in an assembly stiffness or rigidity and a strictly indeformable framework.

The invention will be better understood and further characterizing features, details and advantages thereof will appear more clearly as the following explanatory description proceeds with reference to the accompanying diagrammatic drawings given by way of non limiting examples only illustrating various presently preferred specific forms of embodiment of the invention and wherein:

FIG. 1 is an exploded perspective view with parts broken away showing the shape of a sectional bar provided with an assembling member according to the invention;

FIGS. 2, 3 and 4 diagrammatically illustrte the three operating assembling stages of two sectional bars according to the invention;

FIG. 5 is a perspective view illustrating another shape of sectional bar according to the invention;

FIG. 6 is a perspective view of an assembling member according to the invention, adapted to be mounted into the sectional bar shown in FIG. 5;

FIG. 7 is a perspective view of an alternative embodiment of a sectional bar according to the invention;

FIG. 8 is a perspective view of the sectional bar shown in FIG. 7 and provided with a modified assembling member according to the invention;

FIG. 9 is a cross sectional view of the sectional bar and assembling member shown in FIG. 8; and FIGS. 10 and 11 are two diagrammatic views illustrating the assembly arrangements of sectional bars of the kind shown in FIG. 8.

Reference should at first be had to FIGS. 1 to 4 which depict a first form of embodiment of a sectional bar and of its assembling member according to the invention as well as the main stages of the process of assembling.

The sectional bar or like structural or shaped part 20 shown in FIG. 1 comprises a central core 21 consisting of four curvilinear surfaces 23 having the shape of a star with four limbs inside of which may be housed an assembling member 22 forming a clamping, bonding, coupling, joining connecting like tie device. One of these surfaces 23 is formed with an opening 24 extending in parallel relation to the centre line axis of the sectional bar and through which may project a locking screw 25 operating through pressure and screwed into a screw-threaded or tapped hole of the assembling member 22. Each pair of adjacent legs or limbs of the sectional bar defines at the outside a half-closed groove or like channel or slot 26 the opening of which is partially closed by two coplanar lips or like flanges provided at the ends of said legs, respectively, each lip or flange 27 being formed on its inner face with a slightly projecting narrow groove 28 slightly recessed or set back from its edge. Two of the curvilinear opposite surfaces 23 carry each one on their inside faces a projecting rib or like ridge 29 forming a means for guiding and holding against rotation the assembling member 22.

This assembling member 22 comprises a metallic sleeve or trunk 30 adapted to receive the end of a cylindrical rod or stem 1 formed with a helical groove 3 which extends over a quarter turn about the stem 1 the other end of this stem comprising a head portion 2 having a generally prismatic elongated shape of larger size and extending at right angles to the center line axis of the stem or shank while having a width at most equal to that of the inlet opening into a groove of a sectional bar, the substantially flat bearing face of said head portion being bounded sidewise by sharp edges 6. The set screw 25 operating locking through pressure is screwed into a screw-threaded or tapped hole 10 of the sleeve 30 and is caused to project into the helical groove 3 which terminates as known per se into a cup-like recess at its end adjacent to the locking head portion 2. The length of the helical groove 3 determines the stroke of the aforesaid stem within the sleeve 30 and its ends determine both of the particular positions of the head portion 2.

The sleeve or trunk 30 also comprises on its outside surface a pair of diametrically opposed grooves 11 adapted to be engaged by the aforesaid ribs or ridges 29 of the sectional bar. The sleeve 30 is thus held against rotation within the sectional bar 20.

The stages or operating steps of the process of assembling a pair of like sectional bars forming for instance a standard, upright, post, strut or a like vertical bearer 40 and a cross member 20, respectively, are diagrammatically illustrated in FIGS. 2, 3 and 4.

In FIG. 2 the cross member 20 is directly positioned at right angles with respet to the upright 40 in view of the assembling member 22 being fully accommodated or housed inside of this cross member the set screw 25 projecting through the opening 24 in the cross member 20 being recessed a maximum distance in this opening in a direction opposite from the up right 40.

In FIG. 3 the assembling member 22 has been axially shifted so that its head 2 engages the groove of the upright 40. The screw 25 then assumes an intermediate position within the opening 24 between both ends thereof.

In FIG. 4 an axial pressure has been exerted upon the assembling member through the medium of the screw 25 this pressure being directed towards the upright 40 so that the head 2 be moved in abutment against the bottom or end wall of the groove of the upright 40, rotates through a quarter turn and is caused to bear upon the edges of the flanges or lips 27 of the groove. The locking of the head in this position is then achieved by fully screwing or tightening the screw 25 which then substantially bears upon the forward or front end of the opening 24 located towards the upright 40.

It should be understood that in this position the sharp edges 6 of the head 2 co-operate with the protruding ribs or ridges 28 of the lips or flanges 27 of the half-closed groove of the upright 40 in order to achieve a tightly clamped assembly, connection or fastening or both sectional bars the one onto the other.

It should also be noted that the assembling member 30 is held against rotation in the cross member 20 and that the co-operation of the edges 6 of the head 2 and of the ribs or ridges 28 of the groove of the upright 40 substantially prevents any rotation of the upright 40 with respect to the assembling member.

The invention also provides means for increasing or reinforcing this locking against rotation of both sectional bars with respect to each other.

A second form of embodiment of a sectional bar and of its assembling member is shown in FIGS. 5 and 6.

The sectional bar 41 in FIG. 5 comprises a central core 42 with a square cross sectional contour each edge of which is diagonally extended through dihedron-shaped side legs 43. These side legs 43 are formed with longitudinal side lips or flanges 44 defining a half-closed groove 45 with each face of the central core 42. One of the faces of the core 42 comprises a longitudinal inner rib or ridge 46 adapted to co-operate with a longitudinal groove 47 of the body portion 48 of the corresponding assembling member 49 whereas the opposite face of the core 42 is formed with a longitudinal elongated opening or slot 50 adapted to allow the set screw of the assembling member 49 to extend therethrough.

The outside diameter of the body portion 48 of this assembling member is very slightly smaller than the inner width of the central core 42 so that this assembling member is very easily housed inside of the sectional bar 41 while being guided and held against rotation by the rib 46 projecting into the groove 47. That end of the body portion 48 which is located towards the locking head 52 is formed with a pair of diametrically opposed flattened portions 52 which are parallel to the head portion 51 when the latter is in the outward extended position, i.e. ready to be inserted into a half-closed groove 45 of a sectional bar 41. The distance separating both flattened portions 52 from each other is very slightly smaller than the spacing between both flanges or lips 44 so that this end of the body portion 48 may be inserted with a very small play or clearance into the groove 45 of a sectional bar 41 and held therein against rotation the outside diameter of the body portion 48 being larger than the spacing or gap between the lips or flanges 44 of a groove 45 of a sectional bar 41.

It is therefore easily understandable that when a sectional bar 41 is mounted onto a sectional bar of the same kind by means of an assembling member such as that shown in FIG. 6 the end provided with the flattened portions 52 of the body portion 48 is caused to lock a first sectional bar against rotation whereas the second sectional bar is locked against rotation by the rib 46 of its core 42 accommodated within the groove 47 of the body portion 48.

The assembly achieved is thus rigid and strictly indeformable.

In FIGS. 7 to 11 has been shown still another alternative embodiment of the invention wherein the sectional bar and the assembling member exhibit new shapes.

The sectional bar 60 shown in these FIGS. 7 to 10 is essentially adapted to receive an assembling member 61 such as that shown in FIG. 8, this assembling member having a longitudinal body portion with a T-shaped cross sectional contour.

For this purpose the sectioal bar 60 comprises a pair of parallel flat inner guiding surfaces 62 arranged opposite to each other and provided on two parallel opposite faces, respectively, of the sectional bar, a guiding groove 63 provided on the inner face of one side of the sectional bar extending at right angles to the flat surfaces 62 as well as a guiding surface 64 integral with the fourth side of the sectional bar. It is seen in FIGS. 8 and 9 that the body portion 65 of the assembling member 61 when it has been properly inserted into the sectional bar 60 is perfectly guided and held against rotation.

As previously the body portion 65 of the assembling member comprises a cylindrical hole into which is received the stem or or shank 66 carrying the locking head 67 at its outer end. The corresponding end of the body portion 65 is longitudinally extended on both of its side edges by two projecting parts 68 which are adapted to be inserted together with the head 67 into a half-closed outer groove 70 of the sectional bar 60. These parts 68 have each one a width $l$ which is very slightly smaller than the width $l_1$ of the inlet or opening of one groove 70 so that these parts 68 may be inserted into one groove 70 and forthwith locked therein against rotation. This assembly-mode is diagrammatically shown in FIGS. 10 and 11.

A sectional bar 60 provided with the assembling member 61 is brought perpendicularly in front of or registering relation to the groove 70 of a second sectional bar 60 positioned at right angles to the first one. Through displacement of the set screw 71 of the assembling member 61 in the elongated opening or slot 72 of the first sectional bar 60, the head portion 67 is caused to project into the groove 70 of the second sectional bar 60. By keeping on moving with axial displacement through the screw 71 the protruding parts 68 of the body portion 65 are caused to engage the groove 70 and at the same time the head 67 is given a quarter turn rotation. The screw 71 fully screwed then retains the head 67 in this position.

The assembly achieved is strictly indeformable owing to the fact that the second sectional bar 60 may not rotate about the first one the protruding parts 68 of the assembling member projecting into its groove 70 and likewise the locking member 61 is held against rotation in the first sectional bar 60.

The invention thus enables to achieve a tightly clamped and indeformable assembly of the sectional bars adapted to form frameworks or reinforcing bracing structures for instance for partition walls in office rooms.

It should be understood that the present invention is not at all limited to the forms of embodiment described and shown which have been given by way of examples only. In particular it comprises all the means constituting technical equivalents of the means described as well as their combinations if the latter are carried out according to its gist and used within the scope of the appended claims.

What is claimed is:

1. Device for endwise assembling a first sectional bar onto a second sectional bar extending at right angles thereto and having at least one flat face formed with a half-closed groove terminating at its open portion, at said flat face, in lips which restrict the size of the opening, said device comprising a rod portion and a tubular element which receives the rod portion, the latter being provided with an elongated head portion with parallel sides adapted to be inserted into the groove of the second sectional bar at any point thereof and then locked with the latter through a quarter turn rotation, said rod portion being provided with a high pitch helical groove extending over a quarter turn thereabout and terminating in a cup-like recess, a set screw screwed into a threaded hole in said tubular element and engaging said high pitch helical groove, said set screw projecting into the cup-like recess for holding said rod portion againsts motion in the tight clamping position, the position and shape of said cup-like recess ensuring that the lips of said groove are pressed against said head portion and the end of said first sectional bar, said element being positioned within the end of a hollow core of said first sectional bar, one face of this core being formed with an elongated slot the length of which is at least equal to the sum of the depth of said groove of said second sectional bar and of the length of said helical groove of said rod portion, said set screw extending through said slot whereby through displacement of said screw in said slot, said head portion may be fully retracted inside of said hollow core of said first sectional bar, said element further comprising means preventing its relative rotation with respect to at least one of said sectional bars.

2. Device according to claim 1, wherein the hollow core of said first sectional bar comprises at least one inner ridge or rib projecting into a corresponding groove of the outer surface of said element.

3. Device according to claim 1, wherein that end of said element which is located towards said head portion comprises at least one projecting part adapted to be inserted together with said elongated head portion into the groove of said second sectional bar, these protruding parts having widths sufficient to ensure against rotation in said groove.

4. Device according to claim 3, wherein said element is a tubular cylindrical shape and is formed on its end located towards said head portion with a pair of diametrically opposite flattened portions defining one aforesaid protruding part therebetween.

5. Device according to claim 3, wherein said element has a T-shaped cross sectional contour, the hollow core of said first sectional bar exhibiting guiding surfaces of corresponding complementary or mating shapes for holding said element against rotation.

6. Device according to claim 5, wherein that end of said element which is located towards said elongated head portion is longitudinally extended on both of its longitudinal side edges to form said protruding parts.

* * * * *